Feb. 1, 1927.          E. H. LYSLE                 1,616,054
            OPTICAL APPARATUS AND METHOD OF USING THE SAME
               Filed April 2, 1926      7 Sheets-Sheet 3
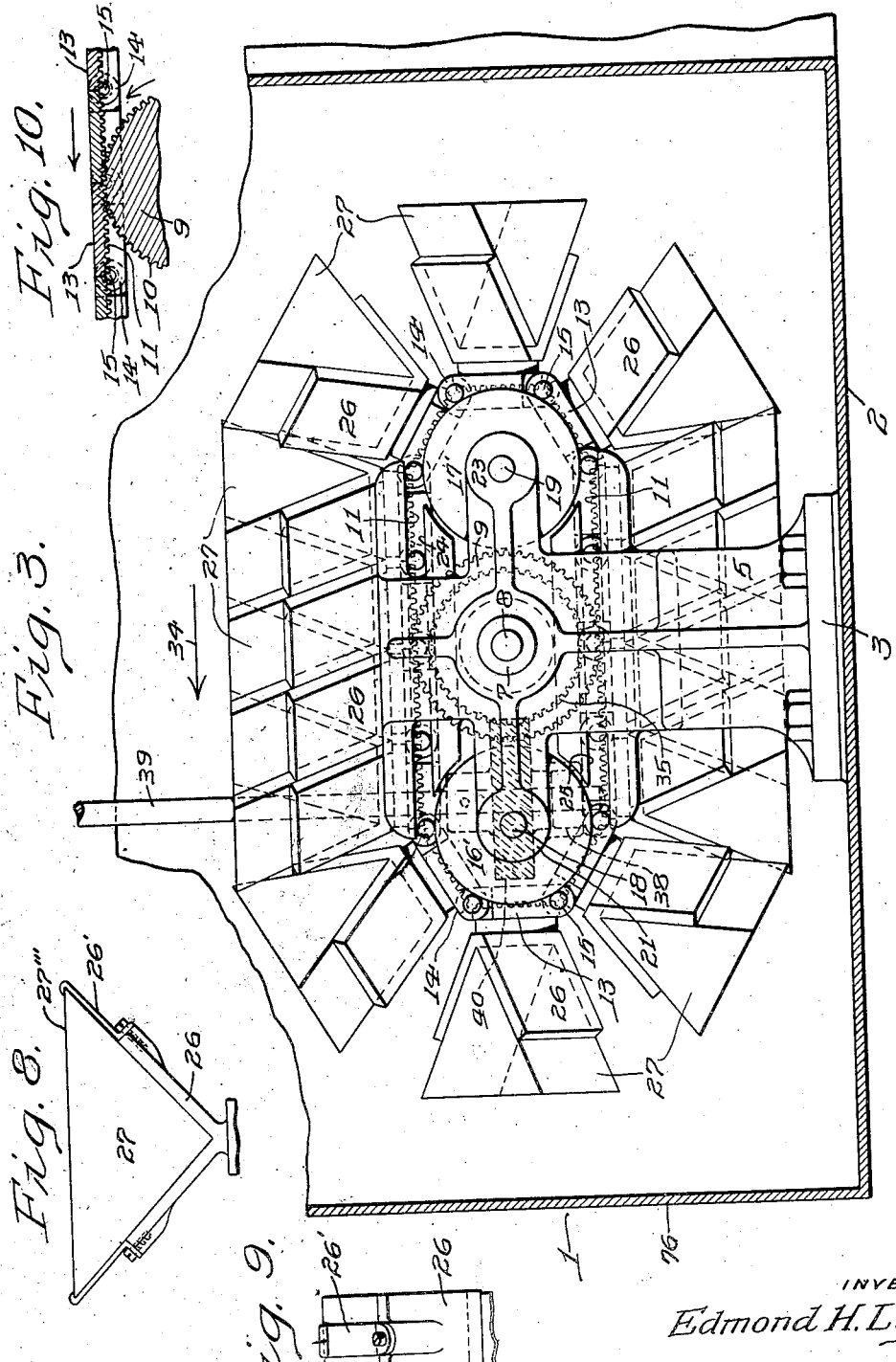
INVENTOR
Edmond H. Lysle.
WITNESS
F.J.Hartman.
BY 
ATTORNEY Feb. 1, 1927. 1,616,054
E. H. LYSLE
OPTICAL APPARATUS AND METHOD OF USING THE SAME
Filed April 2, 1926 7 Sheets-Sheet 4
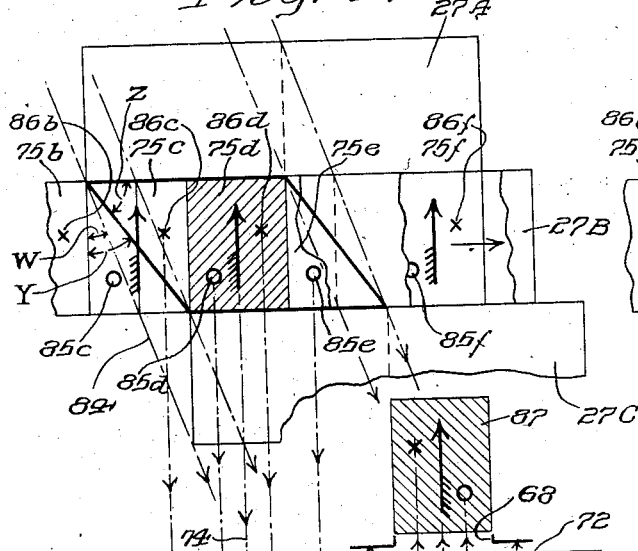
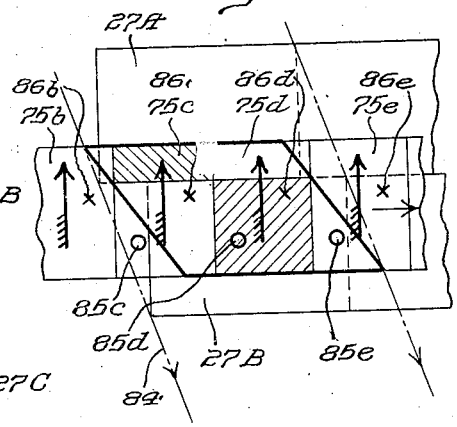
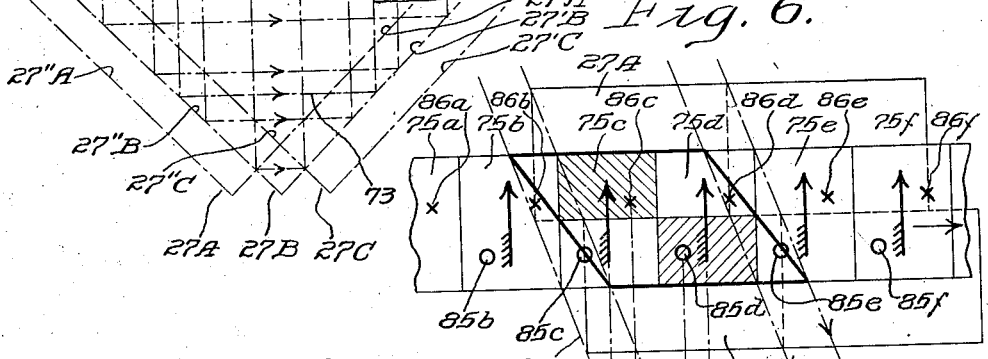
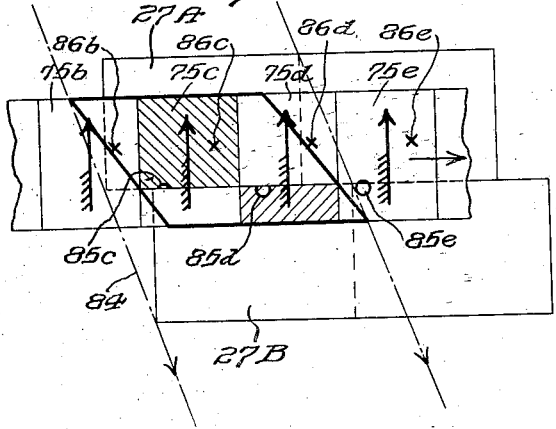
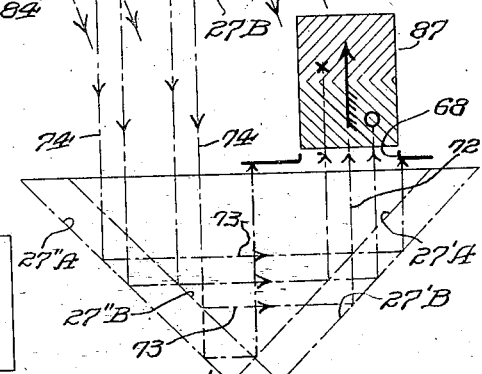
INVENTOR
Edmond H. Lysle.

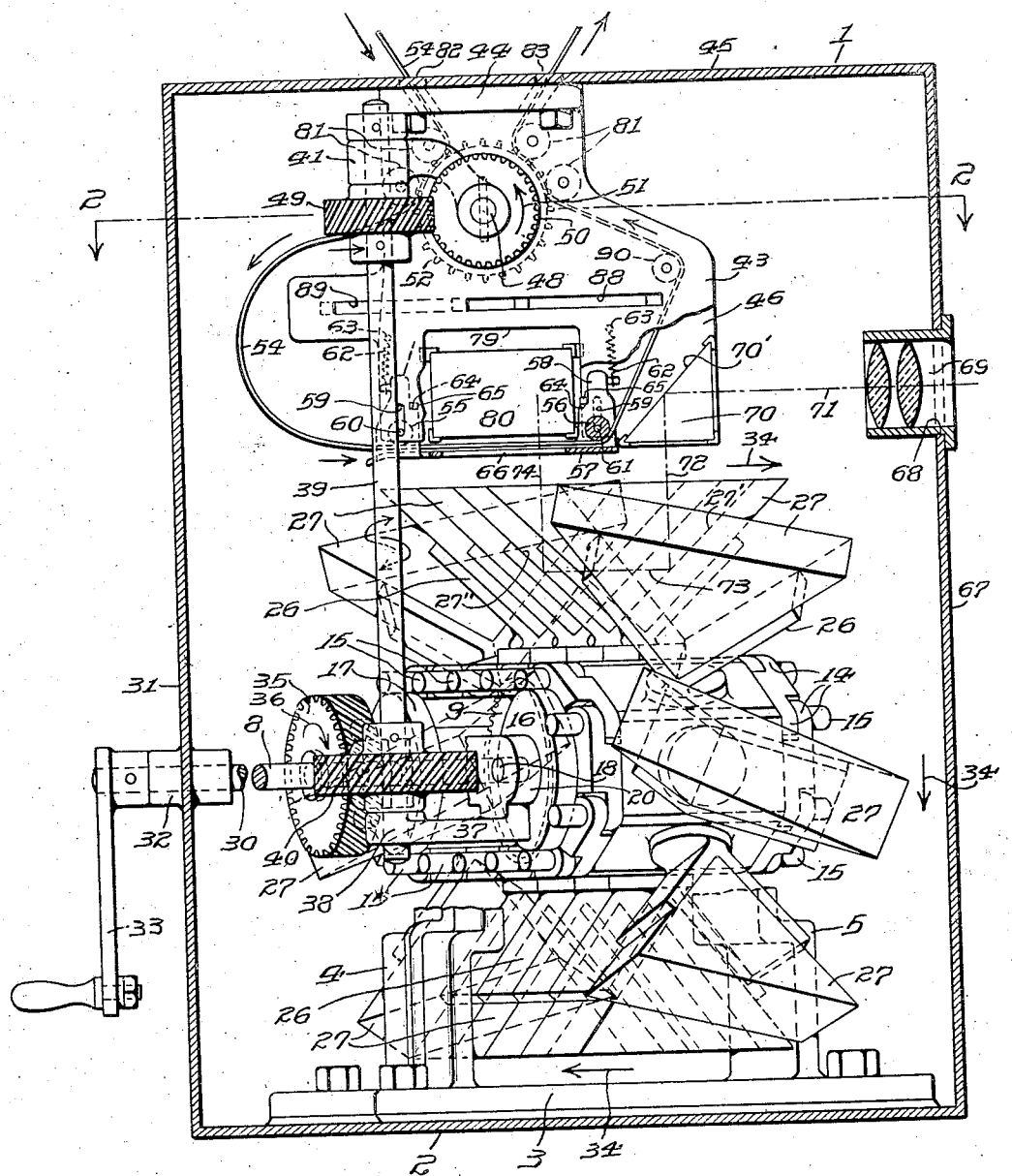

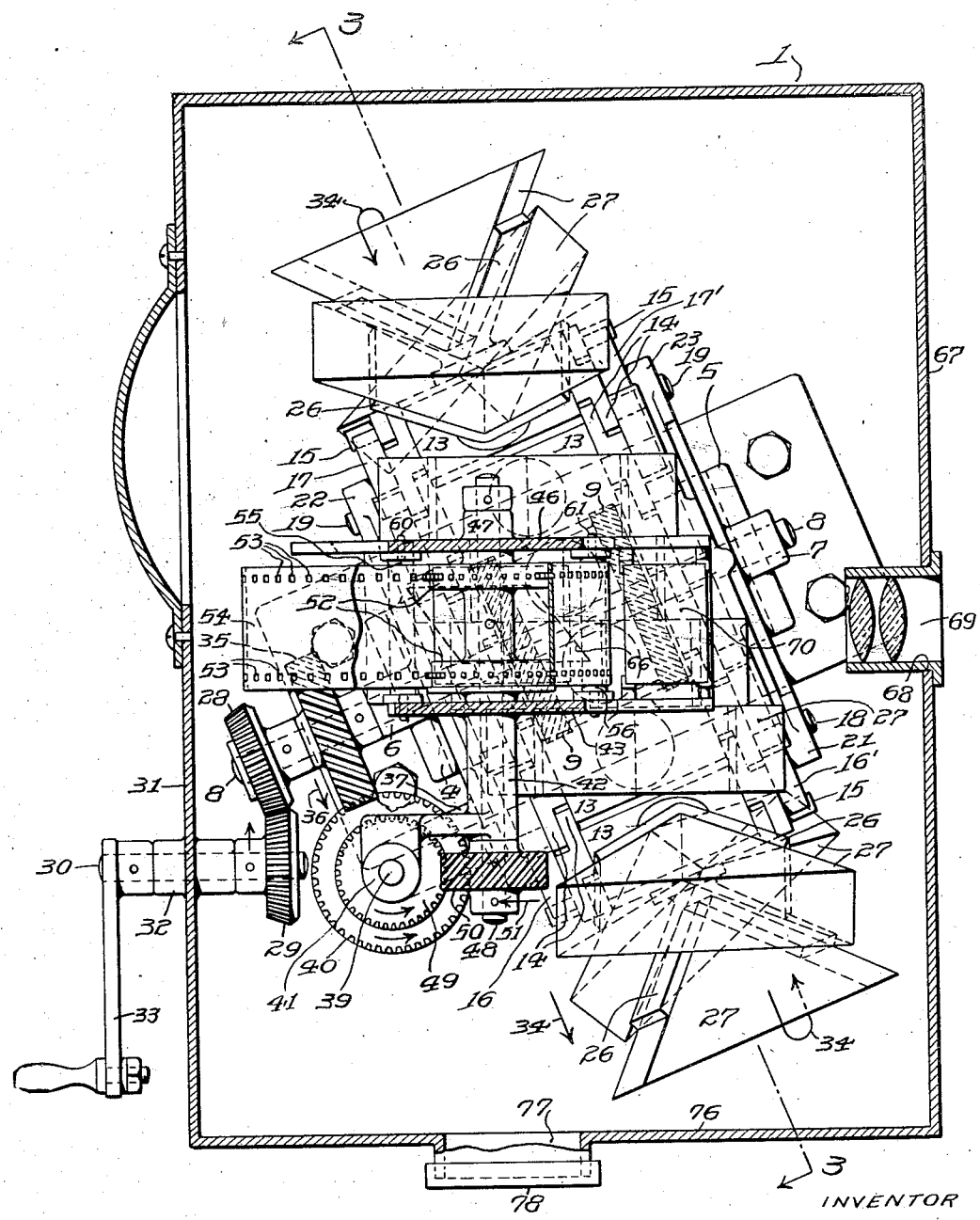

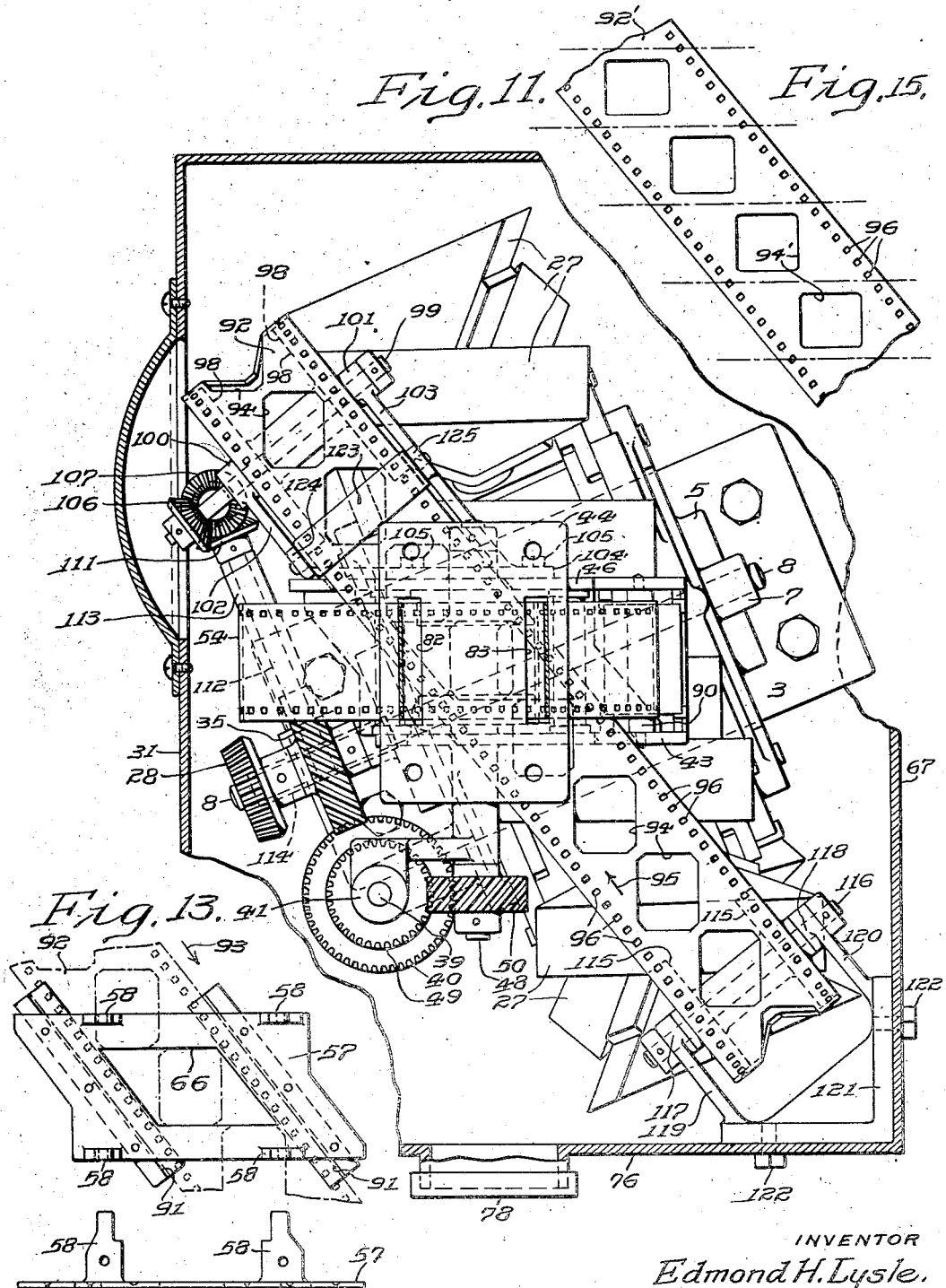

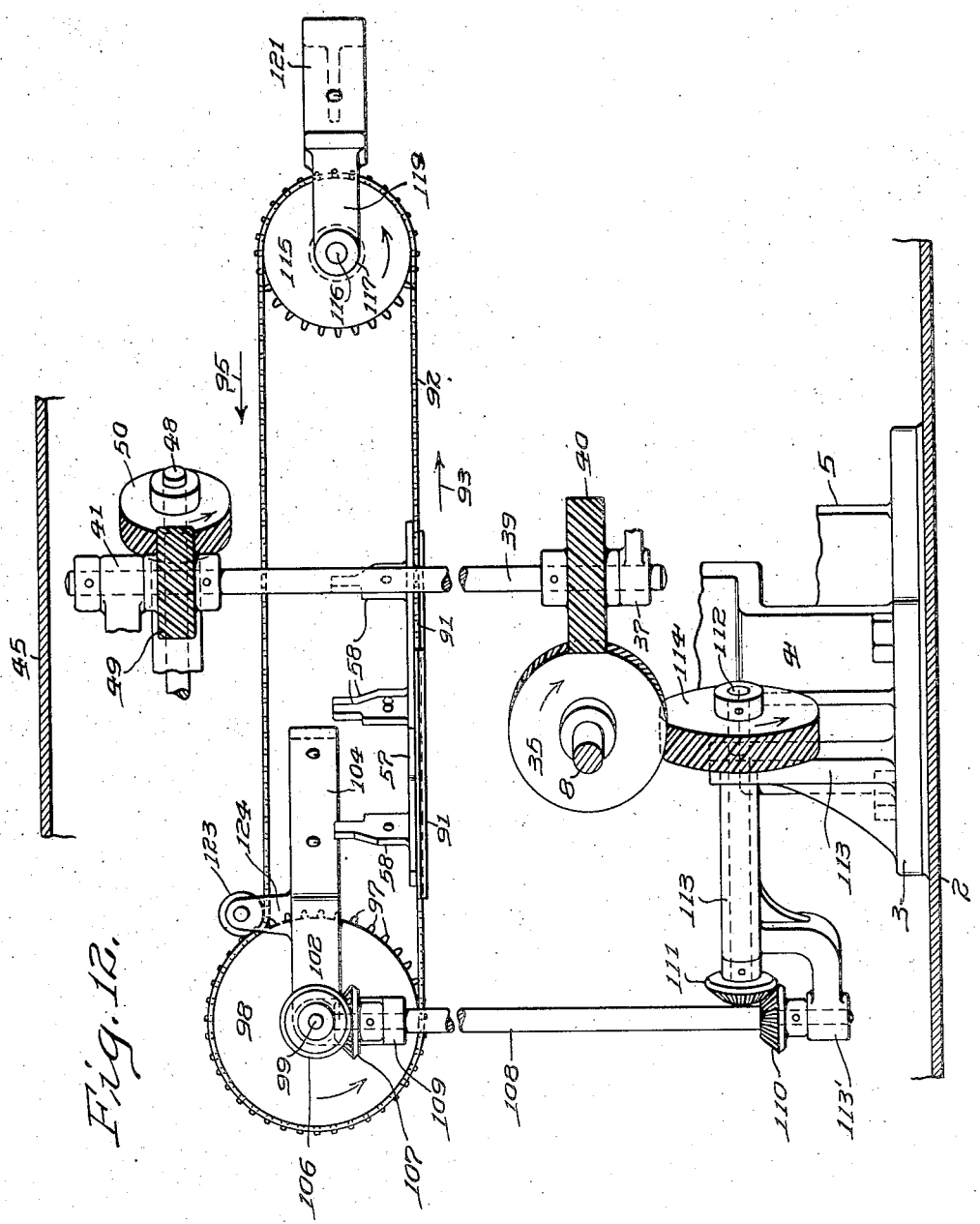

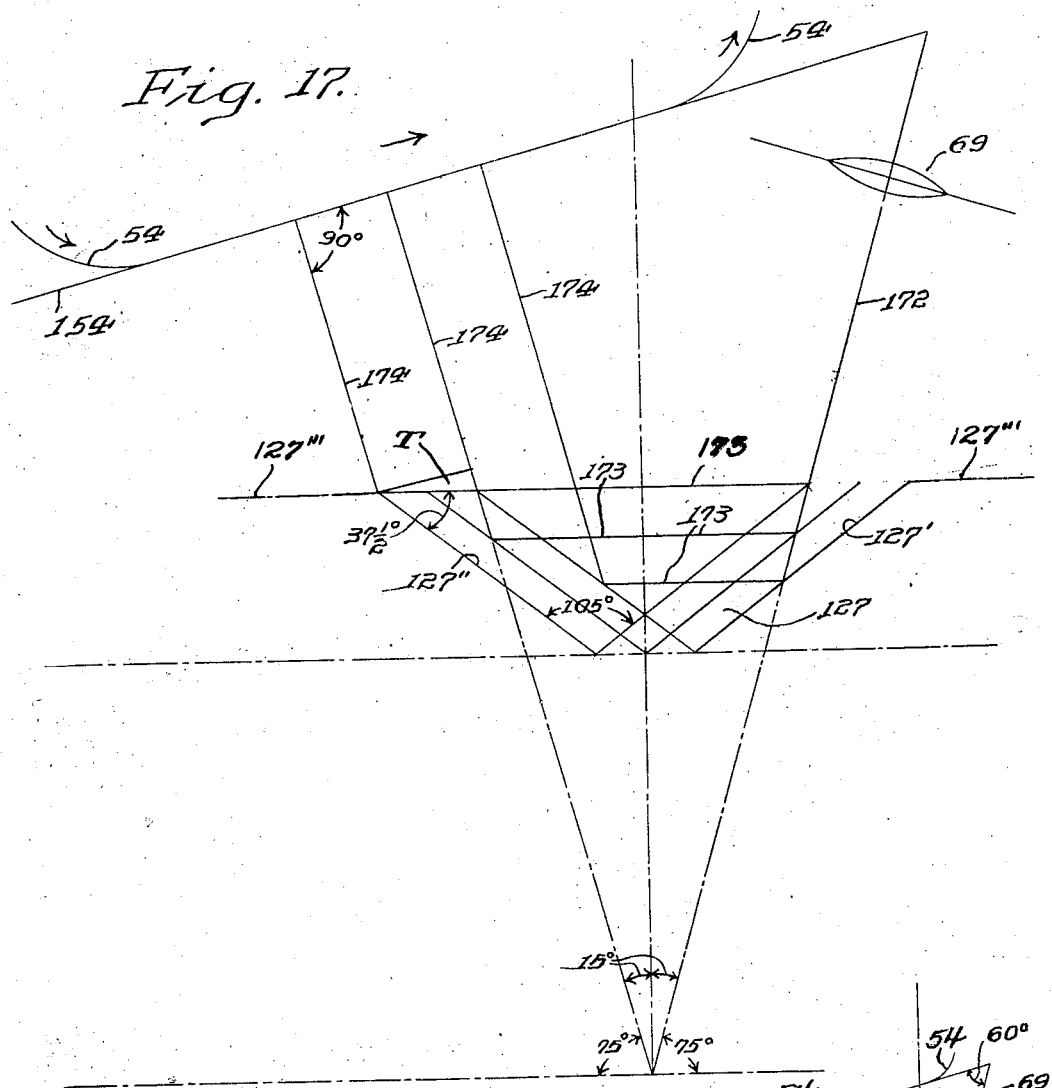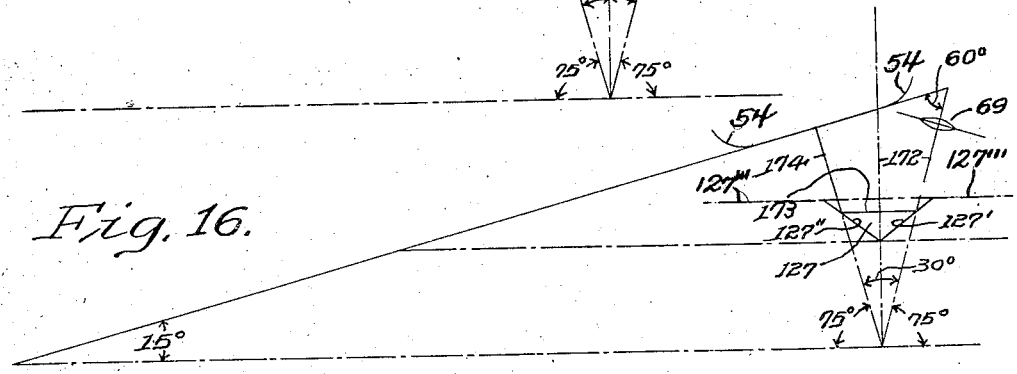

Patented Feb. 1, 1927.

1,616,054

UNITED STATES PATENT OFFICE.

EDMOND H. LYSLE, OF VENTNOR, NEW JERSEY.

OPTICAL APPARATUS AND METHOD OF USING THE SAME.

Application filed April 2, 1926. Serial No. 99,190. BEST AVAILABLE COPY

My invention relates to optical apparatus and to the method of recording and projecting images of objects in motion and more particularly to a mechanism wherein the movement of the sensitized film or the positive prints is continuous, as distinguished from intermittent, and in which a fixed lens system is continuously open, as distinguished from being intermittently opened and closed by a shutter mechanism operated synchronously with the film.

The "present day", "standard" film used for projecting "moving" pictures consists of a celluloid tape about 1⅜ inches wide, perforated along opposite edges for the reception of the teeth of sprocket wheels for impelling the tape longitudinally, and the space between the series or rows of perforations for the sprocket teeth is substantially one inch. The individual pictures are rectangular in shape and the dimensions of each are practically one inch wide and three-fourths of an inch high. The long dimension (width) of each picture is disposed at right angles to the edges of the film and the adjacent edges of successive pictures are practically contiguous. The perforations for the driving sprocket wheels are preferably spaced about six to the inch so that there would be four perforations for each picture, in the direction of the height of each picture.

The above dimensions are not exact but they are approximately correct. The above serves to indicate, for purposes of comparison, what is meant by a "present day" or "standard" film referred to below and as a basis upon which to make plain the principles of my improved optical device.

One object of the present invention is to provide an improved optical device which will continuously make a successive series of photographic records on a sensitized film, or will continuously project a consecutive series of photographic prints of an object in motion by the use of a single series of double reflector units continuously moving through the area of the illumination of a continuously open single lens or lens system.

A further object of my invention is to provide an improved optical device particularly adapted to be used as a camera for making a photographic record of objects in motion, upon a photographic recording medium or sensitized film, which is continuously moving, in such a manner as to maintain the moving film relatively stationary with respect to the axis of the lens system as reflected by a successive series of reflectors continuously moving through the field of the illumination of the lens system, and to make such a record as to size, shape and disposition on the film substantially exactly like the record which is produced by the use of the "present day" "standard" motion picture camera in which the exposures are controlled by a shutter which is intermittently opened and closed and in which the film is intermittently moved and stopped.

A further object of my invention is to provide an improved optical device for maintaining an optically precise and fixed and stationary relationship between the optical center of a single fixed lens system and that portion of a constantly moving photographic medium which is in the field of the illumination of the lens by the use of a series of reflectors, continuously moving through the principal axis of a continuously open fixed single lens system at right angles thereto, and in a plane parallel to the film.

A further object of my invention is to provide an improved optical device adapted to be used as a camera for forming on a continuously moving photographic medium a contiguous and consecutive succession of related photographic records of the consecutive phases of an object, especially when in motion, and by the use of a single lens system which is continuously open, each individual record being rectangular and having two of its sides parallel to the edges of the film.

A further object of my invention is to construct a camera or projector of the type or kind above indicated in such a manner that a single series of double reflecting units, in conjunction with a continuously open single fixed lens system are sufficient to record on or project from a film which is or may be exactly like the "standard" film now ordinarily used in taking or projecting motion pictures, the successive exposures or individual pictures on the film being of the same size, and arranged or disposed on the tape or ribbon in exactly the same way as they are in "present day" "standard" films, viz, with the horizon transverse to the film.

A further object of my invention is to project from or record on a continuously moving film by the use of a moving series of reflectors and a continuously open lens system and as the result of two and only two continuous motions, one a continuous rectilinear movement of the reflectors through the area of illumination of the open lens system and the other a continuous rectilinear movement of the film through the said area of illumination of the lens system, as reflected by said reflectors, said movements being in planes parallel to each other, the directions of the said movements of the reflectors and film being at acute angles to each other, and the ratio of the linear speed of the film to that of the reflectors being constant, said angle and said speed being determined by the dimensions of the individual pictures on the film and their spacing on the film and of course will vary as the dimensions and spacing of the pictures vary. When adjacent individual pictures are contiguous this ratio is determined by the dimensions of the individual pictures only.

A further object of my invention is to provide an optical apparatus which will project upon a screen through a continuously open lens system a successive series of pictures of an object in motion as recorded on a "present day" "standard" film produced by the operation of a "standard" "present day" motion picture camera, or in other words, to project a "standard" film by the use of my improved projector in which the lens system is continuously open and the film is continuously steadily moving.

A further object of my invention is to project a "standard" film by continuously (not intermittently) moving it through a continuously (not intermittently) open fixed lens system.

A further object of my invention is to provide a belt or similar device, moving in a definite timed relation with respect to the film and to the series of reflectors, to limit the area of the sensitized surface of the film which is exposed to the light reflected thereto from the lens, and to prevent the exposure of any part of the film, outside of said area, to light reflected toward the film from the reflector then cooperating with said area.

A further object is to control and regulate the length of time to which the portions of the film, recording successive positions of an object, are exposed to the action of light entering the device through the lens system by a traveling member, provided with a series of openings therethrough, and traveling at an angle to the direction of the travel of the film and to the travel of the reflectors, one component moving across the film, adjacent the sensitized surface of the film in the same time that the reflectors travel the widths of the film and another component moving in the direction of the film at the same speed as that of the film.

Further objects of my invention will appear in the specification and claims below.

Referring to the drawings forming a part of this specification and in which the same reference characters are employed throughout the various views to designate the same parts, Fig. 1 is a side elevational view with parts shown in vertical cross-section and with parts broken away for the sake of clearness of my improved optical apparatus which is capable of being used either as a photographic recorder of objects in motion or a projector of a film having thereon successive pictures of an object in motion.

Fig. 2 is a horizontal sectional view on the line 2—2 of Fig. 1.

Fig. 3 is a front elevational view of the series of reflectors mounted on the carrier therefor and in the frame or support therefor.

Figs. 4, 5, 6 and 7 are diagrammatic views showing the manner in which the photographic record or the projection thereof from a film is effected; the manner and directions in which the film and the series of reflectors travel; the manner in which the exposure or projection is effected, except for an instant, simultaneously through two adjacent picture spaces of the film, the manner in which the angle which the reflectors must make with respect to the line of the travel of the reflectors is determined and the photographic manner in which the film is maintained in fixed relation to the optical center of the lens system as reflected thereto by the moving reflectors during the recording of or the projecting of a series of pictures of an object in motion.

Figs. 8 and 9 show in detail, a mounting for a reflecting prism.

Fig. 10 is a fragmentary section of the driving connection for the carriers;

Fig. 11 is a plan view of the same apparatus shown in Fig. 2 in connection with which is shown the mechanism for imparting a traveling motion to a belt or similar device having a series of rhomboidal openings therein through which light, reflected from the traveling reflectors, passes to the sensitized surface of the film and is employed when the device is used as a camera, for recording successive positions of an object;

Fig. 12 is a side elevational view of the belt operating mechanism shown in Fig. 11, together with only so much of the optical device previously illustrated in Figs. 1 to 4, as will serve to show exactly how the said mechanism may be mounted in or on the optical device and how it may be operated thereby;

Fig. 13 is a plan full detail view of the plate which is partially shown in Figs. 1 and 2; Fig. 14 is a side elevational view of the same;

Fig. 15 is a plan view of a modified belt structure;

Figs. 16 and 17 are diagrammatic views of a layout of a modified form of my invention in which the angle between the reflecting surfaces of the traveling reflectors is greater than 90°, as for instance 105°, and showing the relative positions of the lens, the prisms or reflectors and the position and direction of travel of the film.

My improved recording or projecting apparatus is suitably mounted and enclosed in a suitable box or casing 1 on a wall 2 on which is rigidly mounted a main base or support 3 from which rises two spaced uprights 4 and 5 having respectively bearings 6 and 7 for the main driving shaft 8 journaled therein. Rigidly secured to the said shaft are driving gears 9, the teeth 10 of which are adapted to mesh into coacting teeth 11 of the racks 12 on the underside of a series of plates 13, each of which is practically a link of a continuous link chain. On the front and back sides of each plate 13 are lugs 14 through which extend pins or pintles 15 whereby each link or plate is pivotally connected or hinged to the adjacent link or plate 13. It is to this series of plates or chains that the reflectors, to be referred to below, are rigidly secured and by which the series of reflectors are caused to travel, during a portion of their complete cyclical movement, in a straight line through or across the field of illumination and in a plane at right angles to the principal axis of a fixed lens system of the optical device.

The ends of the pins or pintles 15 extend beyond the sides of the plate links or reflector carriers and it is upon the ends of these pins that the links, plates or carriers 13 are supported. In their orbital movement the ends of the pins come into engagement with and rest upon two pairs of idler wheels 16, 16' and 17, 17' respectively rigidly mounted in shafts 18, 19 respectively journaled in bearings 20, 21, 22 and 23 provided in the uprights 4, 5. In passing around the idler wheels 16, 16', 17, 17', the ends of the pins or pintles 15 rest on these idler wheels disposed on opposite sides of the chain of links or carriers 13. Between the pairs of idler wheels 16, 16' and 17 and 17' the pins 15 slide into and through upper guideways 24 on opposite sides of the chain or carrier and the lower guideways 25, both sets of guideways being formed in or supported by the upright supports 4, 5. In this way the pintles or pins 15 are caused to travel in straight lines between the idlers and through semicircular paths around the idlers. In order that the carriers or plates 13 may freely turn with respect to each other during their travel around the idler wheels without binding or interference of any kind, one with the other, the plane of the axes of the pintles or pins 15 should be and preferably are in the plane of the free ends of the teeth 11 of the racks 12. (See Fig. 10.)

The guideways 24 and 25 are preferably so arranged and disposed that the racks 12 on the backs of the plates or carriers 13 mesh with the teeth 10 or the gear 9 during the forward and during the return movements of the said plates or carriers 13 and at points midway between the pairs of idler wheels 16, 16' and 17, 17' respectively. The top and bottom of the driving gear 9 meshes with the racks 12 on the inner or under side of the plates 13.

To the top or outer face of each plate or carrier 13 is secured, in any suitable manner, a reflector holder 26 in which is fixedly secured, as by the clamps 26', a double reflector 27 which may comprise a triangular prism of glass having two reflecting surfaces 27' and 27'' which, in the preferred form of my invention are disposed at an angle of 90° to each other. These prisms or reflectors 27 are mounted on said reflector holders 26 with their apices adjacent the outer surface of the link or carrier for the same and with their bases disposed in a plane parallel to the plane passing through the axes of the pintles or pins 15. In other words, the plane of the base 27''' of each prism will be parallel to the plane passing through the path of the axes of the pins or pintles during their rectilinear travel between the idlers and the planes of the reflecting surfaces 27' and 27'' of the reflector unit will each be disposed at angles of 45° to the plane of the base 27''' of the prism.

The planes of the parallel sides of the prisms and the longer sides of the rectilinear base of the prisms are disposed at an angle to the direction of the travel of the chain or series of carriers 13. This angle is determined by the size of the individual exposure and the spacing of adjacent pictures on the film 54. The travel of the reflectors 27 is in a plane parallel to the plane of the film and in direction it makes an acute angle with a line normal to the edge of the film. This angle will vary, depending upon the size and spacing of the individual pictures on the film but the trigonometrical tangent of this angle between the line of travel of the prisms and a line normal to the direction of the travel of the film is the ratio of one-half of the spacing of adjacent exposures or individual pictures to the width of such exposure or picture.

Thus, in an ordinary "standard" film, the individual exposures are substantially contiguous or edge to edge and the width or long dimension of each exposure is transverse to the film. The height of each exposure is disposed longitudinally of the film.

These exposures or individual pictures on a standard motion picture film are approximately one inch wide and three-fourths of an inch high. The long dimension of the individual exposed portion of the film or individual picture is at right angles to the length of the film, straight across the film between the perforations at the edges thereof. With such a film one-half of the height or the spacing of individual exposures or pictures would be three-eighths (.375) of an inch and the tangent of the angle above referred to would be, therefore, .375 : 1 = .37500, which is the tangent of the angle 20° 33′ 21″ when the side edges of adjacent exposures are coincident and each exposure is 1x¾ inches.

With such a film, then, the angle W, (Fig. 4) which the direction of the travel of the prism would make to a plane normal to the direction of the travel of the prism would be 20° 33′ 21″. This, however, will be referred to again below, the above being merely for the purpose of clearly bringing out exactly what is the manner of ascertaining in what path the prism must travel with respect to the film and when so ascertained and fixed the long edge of the prism must be parallel to the direction of the travel of the film. This then determines the angle that the reflectors must be disposed with respect to the carriers therefor.

Motion may be imparted to the main driving shaft 8 in any suitable manner and for the purpose of this disclosure, the said shaft is shown (Fig. 2) as provided with a beveled gear 28 fast to the end of the said shaft 8 and meshing with a beveled gear 29 rigidly secured to the inner end of a relatively short crank shaft 30 passing through the wall 31 of the casing 1 and mounted to rotate in a bearing 32 carried by said wall. The outer end of said shaft 30 is provided with a crank and handle 33 for turning the crank shaft 30 manually and imparting a rotative movement to the driving gear 9. By means of this mechanism the series of prisms 27 are caused to travel in the direction indicated by the arrows 34 with the right hand corner of the base of each prism (referring to Fig. 2) in advance of any other portion of that prism. The width of each prism is theoretically equal to the width of the exposure transversely of the film and with the ordinary and "standard" film above referred to, this corresponds to the distance between the marginal sprocket-wheel perforations along the edges of the film and is, generally speaking, an inch. For the purposes of calculation in this specification, the width of each individual exposure on the film is assumed to be one inch and the height three-fourths of an inch, and the width (smaller dimension) of the base of each prism is assumed to be one inch and in passing through the field of illumination of the lens through which the prisms travel in a straight path in the direction of the said arrow 34, the sides of adjacent prisms are assumed to be in contact. In practice, however, there might be a slight clearance between adjacent prisms when moving in a straight path in which case the shortest distance between the forward edge of the base of one prism and the forward edge of the next should be the width of the exposure to wit, one inch.

Similarly, if the adjacent edges of adjacent exposures or pictures were not coincident then to maintain the relationship of 1 : ¾ assumed, the distance from the forward edge of a picture or exposure to the forward edge of the next exposure or picture must be the said three-fourths of an inch.

The film moving mechanism may be and preferably is driven from the main shaft 8 and in the embodiment of my invention herein shown is effected by the following mechanism. The shaft 8 is provided with a skew-gear 35 fast to the shaft 8 and rotating therewith. This gear 35, therefore, must rotate in the direction of the arrow 36. The upright support 4 is provided with an outwardly projecting lug 37 terminating in a vertical bearing 38 in which is journaled the lower end of a vertical shaft 39 provided with a spiral gear 40 meshing with the spiral gear 35. The upper end of the vertical shaft 39 is journaled in a bearing 41 projecting laterally from a bearing 42 extending outwardly from the side plate or support 43 of the film feeding mechanism. This plate 43 is preferably an integral part of the base 44 secured to the top wall 45 of the casing from which base 44 a parallel downwardly extending side plate or support 46 is carried, the side plates 43 and 46 forming a support and housing for the film feeding mechanism. The plate or side wall 46 is also provided with a bearing 47 in alinement with the bearing 42 in the side plate 43 and in these bearings is mounted the shaft 48 of the film feeding mechanism. The upper end of the vertical shaft 39 is provided with a spiral gear 49 meshing with a spiral gear 50 on the end of the shaft 48. With the gear 35 turning in the direction indicated by the arrow 36, the spiral gears 35, 40, 49 and 50 are so arranged as to drive the spiral gear 50 on the shaft 48 in the direction of the arrow 51 (Fig. 1). On the shaft 48 of the film feeding mechanism are mounted two sprocket wheels 52, 52, adapted to engage and respectively mesh with the perforations 53, 53 on opposite sides of the edges of the film 54.

The details of the film box or film feeding mechanism are not to be construed as being limited to the exact details herein shown and described, it being only essential that the film be held optically stationary in the reflected field of illumination of the lens system and consequently move in a plane parallel to the plane in which the bases of the reflectors move while they are passing through the stationary field of illumination of the lens system and in a direction parallel to the long side edges of the bases of the prisms, and at a speed which will cause the film to move the height of an individual exposure (three-fourths of an inch in the standard film) while the prisms move a linear distance of substantially $1\frac{1}{16}$ inches which is the hypothenuse of the triangle the short side of which is three-eighths ($\frac{3}{8}$) of an inch and the long side of which is one (1) inch.

For this purpose of making the explanation of the mechanism as simple as possible, the parts are so proportioned and arranged in the drawings of this specification that six prisms pass a given point for every revolution of the driving gear 9 and the sprocket wheels 52 for driving the film are shown as having twenty-four (24) teeth. Since the spacing or height of adjacent exposures on the film is three-fourths of an inch and the dimension of an individual exposure measured transverse to the film (width) is one inch, and since there are four perforations to the inch in the tape or ribbon for every exposure, the circumference of the smooth portion of the sprocket wheel at the base of the teeth against which the film is pressed is made equal to six times the height of an individual exposure ($1\frac{1}{2}$ inches), and since the shafts 8 and 48 are geared to make the same number of revolutions in a given unit of time, then the linear speed of the film will be to the speed of the prisms as 4 is to 6, with the result that the film will move a distance equal to the height of an exposure while a prism is moving across the film a distance equal to the width of an exposure.

To this end then the circumference of the sprocket wheels 52 are shown as equal to the width of six individual exposures and the gearing between the shaft 8 and the shaft 48 is such as to make the shaft 48 rotate at the same angular speed as that of the shaft 8, the intermeshing gears being all of the same size in the train of gearing between the shaft 8 and the shaft 48.

Between the downwardly depending plates or sides 43, 46 of the film box are journaled two guide rollers 55, 56 which may be mounted in journals fixed with respect to the plates 43, 46. These rollers 55, 56 are preferably of the same size and their axes are in a plane parallel to the plane of the bases of the prisms 27 while they are passing through the field of illumination of the lens system. For holding the film firmly against the rollers 55, 56 I provide a plate 57, the corners of the plate being provided with upturned ears or lugs 58 having slots 59 therein through which pass the shafts 60, 61 of the guide rollers 55, 56 respectively. Thus, the plate 57 can slide vertically over the shafts 60, 61 as guides. The plate is preferably held drawn upwardly and held at the upper limit of its motion by springs 62, 62, the lower ends of which are attached to the lugs 58 and the upper ends of which are attached to pins 63, 63, carried by the side plates 43, 46. Preferably, the plate 57 is prevented from being drawn into direct contact with the periphery of the rollers 55, 56. There should be a space between the plate and the rollers to travel greater or wider than the thickness of the film so that the film in passing under the rollers may float on the plate 57. To provide this space, the side plates 43, 46 may be provided with shoulders 64, which are drawn upwardly into engagement with stop pins 65 by the springs 62.

This plate 57 is provided with an opening 66 therethrough in the shape of a parallelogram, the length of the longer opposite sides of which is twice the height of an individual exposure ($1\frac{1}{2}$ inches) and the distance between the said sides of which is equal to the width (substantially one inch) of an individual exposure. The tangent of this acute angle Y (see Fig. 4), therefore, which this short side of the parallelogram makes with a line at right angles to the direction of the tape will be the ratio of $\frac{3}{4}:1$ or .75000, which is substantially the tangent of an angle of 36° 52′ 11″, and the acute angle Z of the rhomboidal opening itself will, therefore, be 53° 7′ 49″. These angles, however, will be referred to again below in connection with the diagrammatic views 4 to 7.

To go back to the construction of the mechanism, the front wall 67 of the box or casing 1 is provided with an opening 68 in which is mounted a suitable fixed lens system 69. This lens or lens system 69 is continuously open during the operation of the device. It is never closed while a photographic record is being made or projected. The axis of said lens system 69 in the present instance is in a plane passing vertically and longitudinally through the middle of that portion of the film 54 which is immediately over the opening 66 in the plate 57. In order to reflect the light entering the casing 1 through the lens system 69 I provide a mirror or reflector 70 mounting it preferably between the two side plates 43 and 46 of the film feeding mechanism support. The reflecting surface 70′ of this mirror 70 is set at 45° to the principal axis of the lens to reflect the light directly downwardly upon those reflecting surfaces 27′ of the double reflectors 27 which are passing beneath it. This portion of the axis of the lens system is clearly shown in Fig. 1 as 71, 72, the line 71 passing through the center of the lens 69 and striking against the reflecting surfaces 70' of the mirror or reflector 70 and the line 72 passing downwardly from the reflector 70 to the reflecting surface 27'. Up to the time of its incidence with the reflecting surface 27' the position of the principal axis of the lens system is stationary with respect to the stationary parts of the apparatus, but the axis after reflection from the surface 27' moves transversely. Thus the reflected portion 73 moves in a vertical plane as the reflector 27 travels and the portion 74, reflected vertically from the reflecting surface 27'' travels longitudinally. When used as a camera, so long as a reflector 27 is in the field of illumination of the lens system 69 the light reflected therefrom is directed upwardly against the lower sensitized surface of the film 54 and at right angles to the plane of the film.

When the device is to be used as a projector the film 54 is a series of positives or pictures 75 and the wall 76 of the casing 1 will be provided with a suitable opening 77, always closed as by a cap 78 when the device is being used as a camera. Light admitted through this opening 77 passes directly through an opening 79 in the side plate 46 of the film feeding mechanism and thence directly within the loop of the film. Here within the casing for the film moving mechanism and between the side plates 43, 46, I mount a mirror 80 so positioned that its reflecting surface 80' makes an angle of 45° to the direction of the light entering the opening 77 and hence directs light directly downwardly on to and through the film and thence through the opening 66 of the plate 57 to the reflecting surface 27'' of the double reflectors 27 under the opening, thence to the reflecting surfaces 27' and thence upwardly against the mirror or reflector 70 and thence out through the open lens system 69.

The film operating mechanism will be provided, of course, with pressure rollers 81 adapted to hold the film firmly on the teeth of the sprocket wheels 52, 52. The film 54 enters the casing through a suitable slot 82 and makes its exit through another slot 83. A sensitized film will, of course, be in a light-proof film-box tightly connected to the wall 45 so that the film will not be light struck in its passage into and out of the casing 1 or exposed to light at any point in the casing 1 except where it is under the rhomboidal opening 66 in the plate 57.

Referring now to the diagrammatic illustration of Figs. 4 to 7, the reflector or mirror 70 is omitted for the sake of clearness and the light opening is directly over the surface 27'.

In describing the relations and motions of the prisms or reflectors and the film it will be perhaps more simple to first describe the apparatus as a projector rather than as a camera, although the operation of the device as a camera is substantially but the reverse of that of the projector, except as to the belt and the mechanism for moving the same, as will be described below.

In Fig. 4 are indicated in plan view three adjacent reflectors 27 to each of which, and to its reflecting surfaces 27' and 27'' I will add a characteristic letter (A, B, C) to clearly distinguish between them in the diagrams; thus 27$^A$, 27''$^B$, etc. and to the consecutive pictures or exposures 75 on the film I will add a distinguishing letter "a," "b," "c," etc. The rhomboidal opening 66 is also indicated and the film 54 is in its proper position with respect to the rhomboidal opening 66 and with respect to the prisms 27$^A$, 27$^B$, 27$^C$.

In Fig. 4 is diagrammatically shown the relative positions of three reflectors 27$^A$, 27$^B$ and 27$^C$; three adjacent pictures or exposures 75$^c$, 75$^d$, 75$^e$; when the axis of the lens system is in alinement with the center of the reflecting surface 27'$^B$. The sizes of the parts and of the individual pictures are in proportion.

Now the shape, size and position of the rhomboidal opening 66 is readily determined as follows: The upper long side of the opening is the length of and coincident with the top edges of adjacent pictures 75$^c$ and 75$^d$. The lower long side of the opening 66 is coincident with bottom edges of adjacent pictures 75$^d$ and 75$^e$. The short sides of the rhomboidal openings 66 are respectively diagonals of pictures 75$^c$ and 75$^e$.

From this layout the direction of the travel of the reflectors is readily determined by drawing a line 84 from the upper left-hand corner of the opening 66 and the upper left-hand corner of the picture 75$^c$ when they are coincident to a point midway between the opposite short sides of the picture 75$^c$, for the speed of the component of the motion of the reflector in the direction of the movement of the film should be one-half the speed of the film. In Fig. 4 the parts are shown at the beginning of a cycle of operations and movements. The picture 75$^d$ is directly over the middle of the reflecting surface 27''$^B$ of the reflector 27$^B$. The only reflector which is active at this moment is the reflecting surface 27$^B$ that is directly under the picture 75$^d$. That is projected out through the opening 68 of the lens system as image.

The adjacent reflectors 27$^A$ and 27$^C$ are clear of the opening 66. The entire picture 75ᵈ and that alone is reflected out through the lens opening 68. Thus neither the circle 85ᵉ of picture 75ᵉ nor the cross 86ᵉ of the picture 75ᶜ, although over the reflecting surface 27″ᴮ, is reflected out of the opening 68 of the lens system 69 by reflecting surface 27‴ᴮ as clearly shown in Fig. 4. The film steadily moves to the right a distance equal to the width of an individual exposure or picture while a reflector moves along the line 84 until it has completely passed under the film or the height of an exposure 75. Now moving at these speeds and in the directions above stated that position shown in Fig. 5 is reached. The reflector 27ᴬ has moved part way under the film 54 and a little to the right of the position shown in Fig. 4, so that the upper part of the picture 75ᵉ is over the reflector 27ᴬ and the lower part of the picture 75ᵈ is over the reflector 27ᴮ. This movement will continue until the film and prisms have progressed to the position shown in Fig. 5 when equal parts of the pictures or exposures 75ᵈ and 75ᵉ are over equal parts of the reflecting surfaces 27‴ᴬ, 27″ᴮ of the reflectors 27ᴬ and 27ᴮ respectively, as indicated by the shading in Fig. 5. The shaded portions of pictures 75ᶜ and 75ᵈ are all that would be reflected at any time out of the opening 68 of the lens system.

In the Fig. 5 the shaded half of 75ᶜ is over the reflecting surfaces 27″ᴬ of double reflector 27ᴬ and the shaded portion of picture 75ᵈ is over the reflecting surface 27″ᴮ of reflector 27ᴮ. Thus the arrow head on picture 75ᶜ and which lies over the reflecting surface 27″ᴬ of reflector 27ᴬ, is caught on reflector surface 27″ᴬ, is reflected to surface 27′ᴬ thence upwardly where it appears in the top half of the projected image 87. The cross 86ᶜ on the upper half of picture 75ᶜ will also be caught by reflecting surface 27″ᴬ, reflected over a reflecting surface 27′ᴬ and thence upwardly to the upper half of the image 87 and through the opening 68 of the lens system. Similarly, the lower half of negative 75ᵈ which is over a portion of reflector 27ᴮ and containing the feather of the arrow and the circle 85ᵈ is caught by the reflecting surface 27″ᴮ, is reflected over to reflecting surface 27″ᴮ whence it is reflected outwardly through the lens opening 68 and forms the lower half of image 82. The arrow head of picture 75ᵈ which lies over the reflector 27ᴬ may be caught on reflecting surface 27″ᴬ but its reflection vertically from reflecting surface 27′ᴬ is not through the opening 68 of the lens system and forms no part of the image 87. It will now be apparent that the shaded portions of two adjacent pictures appearing within the rhombodial opening 66 of the diagrams are combined by their respective reflectors to form the complete image projected out through the openng 68 of the lens system. In that travel across the opening one individual picture develops, as it were, until it reaches the position shown in Fig. 4 and diminishes or rolls up as it traverses the second half of its travel across the opening 66. This movement is progressive and continues throughout the operation of the film and series of prisms. The corners of the exposed portions of two adjacent pictures follow down the shorter sides of the rhomboidal opening and except for an instant, in one position, which is shown in Fig. 4, the image 87 is composed always of reflections from complemental parts of two adjacent individual pictures 75 on the film.

And so in using the device as a camera for making a photographic record of an object in motion, the light entering the lens is always caught, except for one instant (corresponding to Fig. 4), on two reflecting surfaces 27′ and reflected respectively to two adjacent parts of the film and two complemental parts as reflected by the double reflectors 28 simultaneously progressively expose two adjacent picture surfaces on the film. The exposure of each individual picture section or portion of the film, is a progressive exposure starting at one narrow side of the surface to be exposed, increasing in height until the entire individual surface is, for an instant, completely illumined, and then decreases in height until it vanishes at the lower edge of the opening 68.

And this produces a consecutive series of individual negatives on a film substantially as they would appear if they were taken in an ordinary motion picture camera wherein the film is intermittently jumped to successive positions and exposed, when motionless, by an intermittently operated shutter. In my apparatus some part of the film is being exposed all the time the coacting reflector is traveling across the film. It is possible, therefore, to get a longer exposure of each individual negative with the use of my improved camera than it is with those cameras which have a shutter mechanism which is intermittently opened and closed and in which the exposure can only be made while the film is motionelss. Or, conversely, if the length of the exposure in the ordinary camera is sufficient to obtain a satisfactory negative, then by use of my apparatus many more individual negatives may be made in the given length of time than can be made with the ordinary shutter controlled camera.

In the above description of my improved mechanism, I have purposely omitted, for the sake of clearness, reference to a mechanism which is employed in and forms a part of the mechanism heretofore described, when the device is used for a camera. To try to illustrate this mechanism superposed over the plan view shown in Fig. 2 or in the elevational view shown in Fig. 1 would render the drawings more complex and involved than it would be if reference thereto were omitted in the general description of the construction and the relation of the film and reflectors of the projector and camera. This additional mechanism just referred to is not necessary when the device is used as a projector but when it is used as a camera it is desirable to limit the area of the exposure of the sensitized surface of the film to the exact dimensions of the picture to be photographically formed on the film. If this area were not limited, the fogging of the negative on each side of the picture or a double exposure of the same sensitized surface would result.

When the device is to be used as a camera, therefore, I arrange a traveling belt or similar structure having a series of openings therein each of the size of the picture to be formed on the sensitized surface of the film and move this belt in such a manner that the opening therein will progress transversely across the film in exactly the same manner that a single exposure is made on the film is effected.

For this purpose, it will be observed that I have shown in Figs. 1 and 2 the side plate 43 as provided with an opening or slot 88 and the side plate 46 as provided with a similar slot 89, and I have shown an idler roller 90 mounted between the side plates 43 and 46 to carry the film 54 clear of the slot 88.

The pressure plate 57 is shown in greater detail in Fig. 13 than it is in Fig. 1 and is preferably provided on its lower side with a pair of parallel guideways 91 extending parallel to the short sides of the rhomboidal opening 66 therein, in which a belt 92 is adapted to travel or be moved in the direction indicated by the arrow 93. In Fig. 11 is shown in plan view, the belt driving mechanism disposed over the reflecting prisms 27 and the way it is disposed angularly with respect to the film 54. This belt 92 is provided with a series of like substantially rectangular openings 94 and in the embodiment of my invention shown in Fig. 1, wherein is shown the top course or level of the belt, the direction of this upper course of the belt will be in the direction of the arrow 95. In this form of my invention then, what may be termed the forward narrow side 94ª of an opening 94 will be in alinement with what may be properly termed the narrow rear side 94ᵇ of the opening 94 in advance thereof, and the left hand side 94ᶜ of an opening 94 will be in alinement with the right side 94ᵈ of the opening in advance thereof. If the openings were exactly like the exposures on the film, the corners of the openings would coincide and would cut the belt in two. I therefore bevel the corners of each opening as clearly shown in Fig. 11 to maintain the integrity of the film. These openings 94 are preferably of approximately the same size and shape (except for the beveled corners) of a single complete exposure on the film. When, therefore, the exposure is, as we have heretofore assumed to be, viz, ¾ of an inch high and one inch wide, the openings 94 will be ¾ of an inch wide and one inch long where a full exposure of the film is desired.

The belt 92 is provided with two rows of marginal perforations 96, 96 adapted to be engaged by suitable teeth 97 on the driving sprocket wheels 98, 98 which may be supported on a driving shaft 99 journaled in suitable bearings 100 and 101 provided in arms 102 and 103 respectively of a bracket 104 rigidly secured as by bolts 105 to the side plate 46 of the film driving mechanism. The upper course of the belt 92 preferably passes through the openings or slots 88 and 89 in the side plates 43 and 46 respectively and the lower course of the belt is adapted to travel through the guideways 91 on the underside of the presser plate 57. The shaft 99 of the sprocket wheels, 98, 98 may be driven in any suitable manner as by a bevel gear 106 rigidly secured to the end of the shaft 99 and meshing with a bevel gear 107 of the same size as the gear 106 and mounted on the upper end of a vertical shaft 108, the upper end of which is journaled in a bracket 109 on the arm 102 and the lower end of which is journaled in a bracket 113′ and is provided with a bevel gear 110 meshing with a bevel gear 111 of the same size as bevel gear 110, and mounted on the end of the shaft 112 mounted to rotate in a suitable bearing bracket 113. The other end of a shaft 112 is preferably provided with a skew gear 114, meshing with the underside of the skew gear 35 on the shaft 8. Preferably the gears 35 and 114 are of the same size, the gears 110 and 111 are of the same size, and the gears 106 and 107 are of the same size, so that the shaft 99 will have the same angular speed of rotation as the shaft 108. This is for the purpose of making it comparatively easy to determine the diameter of the driving sprocket wheels 98, 98 which will produce the correct speed of the belt 92 with respect to the traveling speed of the reflectors 27 and to the linear speed of the film 54. Following then the same method that was employed in determining the size of the film sprocket wheels 52, 52, if the periphery of the sprocket wheels 98, 98 be six times the diagonal of a rectangle, one side of which is one inch long and the other side of which is ¾ of an inch long, then six openings 94 will pass a given point in the same length of time that six reflectors 27 will pass the same point and also while six times ¾ of an inch of film will pass the same point.

Having thus determined the circumference, (and consequently the diameter) of the driving sprocket wheels 98, the lowest point of the sprocket wheels 98 should be in the plane of the guideways 91 and consequently the lowest portion of the idler sprocket wheels 115, 115 should be also in the same plane. These idler sprocket wheels 115, 115 may be mounted in any suitable manner as on a shaft 116 journaled in suitable bearings 117, 118 in the arms 119, 120 respectively of a bracket 121 which is conveniently shown as secured to the side walls 76 and 67 by bolts 122. In the embodiment of my invention shown in Fig. 1 the space between the lowest part of the film driving sprocket wheels 52 and the plate 57 is limited, that is to say, it is less than the diameter of the belt driving sprocket wheels 98 and therefore the diameter of the idler sprocket wheels 115, 115 should be such that their highest points are in the plane of the slots 88 and 89. I, therefore, further preferably provide an idler roller 123 preferably journaled in arms 124 and 125 extending upwardly from the arms 102 and 103 so positioned as to maintain the upper course of the belt 92 horizontally and in the plane of the slots 88 and 89 before the belt passes to the driving sprocket wheels 98.

When provided then with this belt 92 and properly adjusted, each opening 94 in the lower course of the belt in its travel across the film beneath the film will move exactly as the pictures, for instance, 75$^c$ and 75$^d$ of Fig. 5 traverse across or develop on the film 54 and only that area of sensitized film which is to receive light in forming a picture thereon will be exposed to the field of illumination of the lens through that opening 94, as one opening 94 travels across the film in the same manner that the picture 75$^d$ passes through or under the opening 66 in the plate 57, then the next opening will follow down and across the film following the manner in which the picture 75$^e$ is caused to traverse through the field of illumination of the lens and those portions of the film beyond all four edges of a given opening will be protected from the light, entering the camera and projected against the film, exactly in the same way that an individual picture of an exposed film is projected and unfolded as clearly shown in Figs. 4 to 7.

In Fig. 15 I have shown a modified form of belt particularly adapted for shortening the time of the exposures of the individual pictures. Thus, when the conditions under which a particular picture is taken are such that the time required for the traverse of a large opening 94 over the film 92 would result in an over exposure of the plate, then I may use a belt 92' like the belt 92 previously described, but in which the openings 94' in the belt 92' are less than an inch long in the direction of the travel of belt 92' transverse to the film 54, but ¾ of an inch wide, as before. This shortened opening thus reduces the time that a particular section of the film cooperating therewith is exposed to the action of the light entering through the lens. My invention, therefore, contemplates a set of belts with openings of various lengths transverse to the travel of the film to enable the operator to vary the time of exposure of the film, as may be necessary or desirable, by using a belt having an opening 94' of appropriate length.

It is to be clearly understood that the belt 92 in no way interferes with or cuts off the finder sight or path for projector light from the opening 77 to the reflector 80 and that the sprocket wheels 98, 98 are shown as the driving sprocket wheels for the belt 92 for the mere purpose of illustrating one way in which motion may be imparted to the belt by a mechanism clearly out of any path of light heretofore described, into, out of, or through the mechanism, but my invention is not to be construed as limited to the exact means for driving the belt, so long as the proper speed and path of travel of the belt in a plane between the lens and the film and adjacent the exposed surface of the film is maintained.

And in projecting with my improved apparatus, one picture is always developing into the next without flicker or interruption of any kind for substantially the same amount of light is continually passing through the lens to the screen and is never interrupted.

While in the form my invention herein above described, the reflecting surfaces 27' and 27" of each reflector unit 27 are disposed at an angle of 90° to each other and at angles of 45° to the plane parallel to the plane of movement thereof, my invention also contemplates a construction wherein such reflecting surfaces may make any other suitable angle with each other and lesser or greater angles with the plane of movement of the reflector units so long as the angle which one of the said reflecting surfaces make with the said plane is the same as that which the other reflecting surface makes therewith. The triangle formed by the intersecting planes of the reflecting surfaces and the plane 127''' through the outer edges thereof should be an isosceles triangle. There are instances when a greater angle than 90° between the reflecting surfaces 27' and 27" of a reflector unit 27 might be an advantage, as for instance, in order to conveniently mount the lens 69 in the wall 45 and to provide ample space for the passage of the light from such lens so located in the wall 45 directly to the reflector unit 27, thereby dispensing with an intermediate reflector 70.

Fig. 16 is a diagrammatic view showing the relations of the planes of motion of the film and the relative positions of the lens 69, film 75 and a reflector 127 when the reflecting surfaces are fixed at an angle of 105° with respect to each other and Fig. 17 is a diagrammatic view of three positions of the reflector unit 127, and on a larger scale than Fig. 16. It is understood, however, that the angle 105° has been arbitrarily chosen as a convenient one to illustrate what changes in the disposition of the parts would result if the reflecting surface were fixed at any other angle than 90° with respect to each other as above described.

When the reflecting surfaces 127' and 127'' of the reflector unit 127 make an angle of 105° to each other they must each make angles of 37½° with the base line or plane 127'''. In this modification the part 172 of the axis of the lens which passes directly through the center of the lens 69 is not normal to the base line 127''' which is parallel to the plane of the movement of the unit, but it does make such an angle with the reflecting surface 127' that its angle of incidence (37½°) is equal to the angle of the reflection (37½°) from the reflecting surface 127''. In this respect the arrangement is like that previously described in that the angles of incidence on one reflecting surface 27' and reflecting from the other reflecting surface 27'' are similarly alike in the embodiment of my invention shown in Figs. 1 to 7. And while the plane 154 of the travel of the film 54 in the modification shown in Figs. 16 and 17 is not parallel to the plane of movement 127''' of the reflector unit 127 nor normal to the portion 172 of the axis of the lens between the lens 69 and the reflector 127, it is nevertheless normal to the reflected portion 174 of the axis of the lens system as it is in the previously described construction wherein the plane in which the film lies is normal to the reflected axes 74.

In Fig. 17 is indicated, diagrammatically, three consecutive positions of a reflector unit 127 and from this it will be seen that as the unit travels, the distance 172, 173, 174 between the lens 69 and the surface of the film 54 is maintained constant, just as it was in the previously described construction and that the ratio between the linear speed of the film and the component of the motion of the units in a plane parallel to the direction of the film will be as 2 to 1 as it was in the previously described construction. But in this arrangement, that component of the speed of the reflector which is disposed in the plane of its own motion and longitudinally to the film (from the first apex on the left of Fig. 17 to the next apex) will be appreciably greater than one-half the shortest distance between the corresponding lines 174 which represent the reflected axes of the lens and thus indicate the height of the exposures on the film, because said shortest distance between the reflected axes 174 and 174, as measured parallel to the film, is found on analysis to constitute the base-line or longest side of a right angled triangle (for instance the triangle T) the hypothenuse of which is a line comprising the distance between said reflected axes 174 and 174 as the same is measured in a plane 127''' parallel to the plane of movement of the reflector units; and to cause the reflected axes to travel the height of an exposure on the film, that is to say a distance co-extensive with the length of the base-line of said triangle, the reflectors must move a distance equal to one-half the length of the hypothenuse thereof. The film 54 will be stationary with respect to the reflected area of illumination of the lens system while the film travels a distance equal to the height of one exposure or picture on the film, if the component of the motion of the reflector unit 127 in the direction 154 of the travel of the film 54 is one-half of that of the film, and if the component of the motion of the reflector unit 127 transverse or across the film 54 be as 4 to 3, as in the previously described and preferred construction when the dimensions of the individual pictures or exposures are as 4 to 3. Except as to the details illustrated in Figs. 16 and 17 the operation of the modified construction and the principles involved therein, will be like those first above described and illustrated in Figs. 1 to 7.

In both constructions the reflectors are arranged to travel in or parallel to a plane which is normal to a plane bisecting the angle which the reflecting surfaces make with each other and the direction of the movement of the reflectors in that plane has two components, at right angles to each other in the plane of the film one component normal to the direction of the travel of the film and the other parallel to the direction of the film.

The speed of the reflectors in their plane of movement is such that the speed of the component in the plane of the film transverse to the film bears the relation to the speed of the film that the width of the individual exposure bears to the height of the exposure and the speed of the other component in the plane of the film bears the relation to the speed of the film of 1—2; i. e., the speed of the film is twice the speed of that component of the movement of the reflector which lies in the plane of the film and is parallel to the direction of the movement of the film.

In my improved apparatus, the operative reflectors are in a fixed stationary relationship with respect to each other at all times. By this I mean that the reflectors 69 and 77 do not move and have nothing to do except to change the direction of the axis for convenience in getting the light into and out of the apparatus. The operative reflectors are the two reflecting surfaces 27', 27'' of the double reflectors 27. They are fixed with respect to each other; they do not move with respect to each other; the distance between them is always the same. In my improved projector there are but substantially two operative parts which have to move and move accurately with respect to each other, namely, the film and the series of double reflectors, but these movements are in fixed easily determined planes and the proper speeds and directions of the movements are relatively easy to attain. The film is always normal to the reflected axis of the lens system. The angle of the direction of the travel of the reflectors through the field of illumination of the lens system is controlled and determined by the height and the spacing of the adjacent pictures and with that accurately determined and accomplished it is a comparatively simple matter to provide gearing or sprockets of such a pitch as to move the film a distance equal to the width or narrow dimension of an individual picture portion of the film, while a reflector unit is completely passing under that individual picture portion of the film.

In referring to the sides of the casing as top, front, and back of the casing, it is to be understood that these terms are relative for it can readily be seen that if the apparatus might be turned through 90° to make the height of the object being photographed appear in the individual pictures as parallel to the short dimensions of the picture and that the lens could be readily placed in the wall 45 and the light passed directly upon the reflecting surfaces 27' of each reflector unit, thus dispensing with the reflector 70' and the surfaces 27' and 27'' could be spaced further from each other without changing the operation of the device in the slightest, provided the angular disposition of said surfaces is maintained as above described. Those details, however, are not important to the present invention, it being sought in this specification to describe in detail the principles and modes of operation of a complete and operative embodiment of my invention without limiting myself to the exact details of construction, for it will be apparent that many changes in the arrangement and disposition of various parts of the mechanism may most readily be made without departing from the spirit and scope of the invention claimed herein.

While I have referred to the belt 92 as comprising a flexible opaque band with openings therethrough adapted to register with and frame those portions of the film on which the exposure is being made, I do not intend to limit my invention to such details of construction or operation and for that reason I have shown the belt 92 and 92' as comprising a continuous band of celluloid or similar material, blackened (as by exposure to the light and development) all over its surface except those parts, the edges of which would correspond to the edges of the openings in the belt 92 so that the belt will consist of an opaque band having a series of transparent rectangular, or substantially rectangular, clear openings or windows therein through which light may pass to the sensitized surface of the film 54, said band being moved in the same timed relationship with respect to the film and the series of reflectors as that which I have above described. For the purpose of this description, therefore, the opening in the belt may comprise a hole therethrough or a transparent portion or window in the otherwise opaque belt.

And in both recording and projecting in natural colors such a film as I have above described is very well adapted, for each of the transparent rectangular portions of the film may be given a transparent primary color in a predetermined sequence for both recording pictures and in projecting them. Thus, one transparent opening may be colored red, the next blue and the next green and so on, repeating such a sequence throughout the length of the belt, so that the successive exposures (in photographing) will be formed or made through an appropriate color screen, as is usual in color photography and in projecting a moving picture made in natural colors from a negative formed through such color screens, a corresponding color screen would be used, traveling in the same manner and at the same speed as in recording, and preferably located in the same plane, as in recording, adjacent the film and between it and the lens to project the pictures in their natural colors. It is one of the objects of my invention to record and project in natural colors successive positions of an object in motion, by the use of the continuously moving film and a continuously open lens, by the use of the continuously moving series of reflectors, and a continuously moving series of color screens maintained in registry with the progressive exposure of the individual exposure on such a film.

When, therefore, the apparatus is thus to be used for recording and projecting in natural colors, the belts 92, or a modification 92′ thereof, as shown in Fig. 15, will form an essential part of the projector as well as of the camera, and it is to be understood that this mechanism is to be considered as a part of, and not an addition to, the invention herein claimed.

Having thus described my invention, what I claim and desire to protect by Letters Patent of the United States is:

1. In an optical apparatus, the combination with a continuously open fixed lens system and a film, of two coacting reflecting surfaces, means to move one reflecting surface through the field of illumination of said lens system in a path disposed at right angles to the principal axis of said lens system and the other reflecting surface through a path parallel to the path of said first-mentioned reflecting surface, said two reflecting surfaces being stationary with respect to each other and disposed in planes at right angles to each other and respectively making angles of 45° with the principal axis of the lens system, and means to move said film over said second reflecting surface in a plane parallel to the plane of the movement of said reflecting surfaces and at right angles to the line of intersection of the planes of said coacting reflectors at a speed which maintains said film stationary with respect to the principal axis of said lens system as reflected from said second reflecting surface.

2. In an optical apparatus, the combination with a continuously open fixed lens system and a film, of two coacting reflecting surfaces, means to move one reflecting surface through the field of illumination of said lens system in a path at right angles to the principal axis of said lens system and the other reflecting surface through a path parallel to that of said first reflecting surface, said two reflecting surfaces being stationary with respect to each other and disposed in planes at right angles to each other and respectively making an angle of 45° with the principal axis of said lens system and means to move said film over said second reflecting surface in the plane parallel to the plane of the movement of said reflecting surfaces and at right angles to the line of the intersection of said coacting reflectors, in a direction making an angle to the direction of the movement of said reflecting surfaces and at a speed which maintains said film stationary with respect to the principal axis of said lens system as reflected from said second reflecting surface.

3. In an optical apparatus, the combination with a continuously open fixed lens system and a film, of a reflector having two coacting reflecting surfaces fixed with respect to each other and disposed at an angle of 90° to each other, means to move said reflector in a right line with one reflecting surface passing through the field of illumination of said lens system in a path disposed at right angles to the principal axis of said lens system, the planes of said reflecting surfaces being disposed at 45° to the principal axis of said lens system, and means to continuously move a film over said second reflecting surface in a plane parallel to the plane of the movement of said reflecting surfaces and at right angles to the intersection of the planes of said coacting reflectors and in a direction at an angle to the direction of said reflecting surfaces.

4. In an optical apparatus, the combination with a continuously open fixed lens system and a film, of a reflector having two coacting reflecting surfaces fixed with respect to each other and disposed at an angle of 90° to each other, means to move said reflector in a right line with one reflecting surface passing through the field of illumination of said lens system in a path disposed at right angles to the principal axis of said lens system, the planes of said reflecting surfaces being disposed at 45° to the principal axis of said lens system, and means to continuously move a film over said second reflecting surface in a plane parallel to the plane of the movement of said reflecting surface and at right angles to the intersection of the planes of said coacting reflectors and in a direction at an angle to the direction of travel of said reflecting surfaces, whereby the movement of the reflector has two components at right angles to each other, one component being in the direction of the movement of the film and at a linear speed of one-half of that of the film.

5. In an optical apparatus, the combination with a continuously open fixed lens system and a film, of a reflector having two coacting reflecting surfaces fixed with respect to each other and disposed at an angle of 90° to each other, means to move said reflectors in a right line with one reflecting surface passing through the field of illumination of said lens system in a path disposed at right angles to the principal axis of said lens system, the planes of said reflecting surfaces being disposed at 45° to the principal axis of said lens system, and means to continuously move a film over said second reflecting surface in a plane parallel to the plane of the movement of said reflecting surface and at right angles to the intersection of the planes of said coacting reflectors and in a direction at an angle to the direction of said reflecting surfaces, whereby the movement of the reflectors has two components at right angles to each other, one component being in the direction of the movement of the film at a linear speed of one-half of that of the film and the other component being at right angles to the direction of the movement of the film and at a linear speed bearing the same ratio to the linear speed of the film that the width of an individual exposure has to the height of said exposure.

6. In an optical apparatus, the combination with a continuously open fixed lens system and a film, of a reflector having two coacting reflecting surfaces fixed with respect to each other and disposed at an angle of 90° to each other, means to move said reflectors in a right line with one reflecting surface passing through the field of illumination of said lens system in a path disposed at right angles to the principal axis of said lens system, the plane of said reflecting surfaces being disposed at 45° to the principal axis of said lens system, and means to continuously move a film over said second reflecting surface in a plane parallel to the plane of the movement of said reflecting surface and at right angles to the intersection of the planes of said coacting reflectors and in a direction at an angle to the direction of said reflecting surfaces, whereby the movement of the reflectors has two components at right angles to each other, one component being in the direction of the movement of the film at a linear speed of one-half of that of the film and the other component being at right angles to the direction of the movement of the film and at a linear speed bearing the same ratio to the linear speed of the film that the width of an individual exposure has to the height of said exposure, the width of each reflecting surface being equal to the width of the individual picture on the film.

7. In an optical apparatus, the combination with a continuously open lens system and a film, of a reflector having two coacting reflecting surfaces stationary with respect to each other and making an angle of 90° with each other, means to move said reflectors to carry one of said reflecting surfaces through the field of illumination of said lens system in a path at right angles to the principal axis of said lens system, means to continuously move a film over said second reflecting surface in a plane parallel to the plane of the movement of said reflecting surfaces and at right angles to the line of intersection of the planes of said coacting surfaces, the direction of the movement of said reflectors with respect to said film being transverse to said film and at an acute angle to the direction of the film, whereby the movement of the reflectors has two components at right angles to each other, one component in the direction of the travel of the film and the other component at right angles to the direction of the travel of the film, the angle of the movement of the reflectors being such and the linear speed of the reflectors being such, that the reflectors move in the direction of the travel of the film at one-half of the linear speed of the film and across the film while the film is moving through a distance equal to the height of an individual exposure.

8. In an optical apparatus, the combination with a continuously open lens system and a film, of a reflector having two coacting reflecting surfaces stationary with respect to each other and making an angle of 90° with each other, means to move said reflector to carry one of said reflecting surfaces through the field of illumination of said lens system in a path at right angles to the principal axis of said lens system, means to continuously move a film over said second reflecting surface in a plane parallel to the plane of the movement of said reflecting surfaces and at right angles to the line of intersection of the planes of said coacting surfaces, the direction of the movement of said reflectors with respect to said film being transverse to said film and at an acute angle to the direction of the film, whereby the movement of the reflectors has two components at right angles to each other, one component in the direction of the travel of the film and the other component at right angles to the direction of the travel of the film, the angle of the movement of the reflectors being such and the linear speed of the reflectors being such, that the reflectors move in the direction of the travel of the film at one-half of the linear speed of the film and across the film while the film is moving through a distance equal to the height of an individual exposure, the width of each reflector being equal to the width of an individual exposure.

9. In an optical apparatus, the combination with a continuously open fixed lens system and a film, of two coacting reflecting surfaces stationarily fixed with respect to each other and disposed at an angle of 90° with respect to each other and at angles of 45° to the principal axis of the lens system, means to move one reflecting surface through the field of illumination of said lens system in a path at right angles to the principal axis of said lens system, and means to move a film over the second reflector in a plane parallel to the path of the movement of said reflector and in a direction at right angles to the intersection of the planes of said reflecting surfaces, the ratio of linear speed of the reflectors to that of the film being that the film travels substantially the height of an individual exposure in the same time that the reflecting surfaces move across the exposed portion of said film, the angle of the direction of the travel of the reflectors with respect to the direction of the travel of the film being such that the film is stationary with respect to the principal axis of the lens system as reflected from said second reflecting surface while the reflector is passing through the field of illumination of said lens system.

10. The method of continuously recording images on and projecting images from a film which consists in continuously moving through the field of illumination of a continuously open lens system in a path normal to the axis of said fixed lens system, one reflecting surface of a reflector unit having two coacting reflecting surfaces disposed at right angles to each other, maintained in fixed positions with respect to each other, and making angles of 45° with the principal axis of said lens system, and simultaneously moving a film over the other reflecting surface of said reflector unit in a plane parallel to the plane of the path of movement of said reflector unit and in a direction at right angles to the line of intersection of the planes of said reflecting surfaces, at an angle to the direction of the movement of said reflector unit and at a speed to maintain said film optically stationary with respect to the axis of said lens system as reflected from said reflecting surfaces so long as said reflector is in the field of the illumination of said lens system.

11. The method of recording and projecting photographic records by a continuously open lens system to and from a film having successive areas of exposures which consists in continuously moving through the field of illumination of a continuously open lens system, in a path normal to the axis of said lens system, one reflecting surface of a reflector having two coacting reflecting surfaces disposed at right angles to each other and maintained in fixed positions with respect to each other and making angles of 45° with the principal axis of the lens system, and simultaneously moving a film over the other reflecting surface of said reflector, in a plane parallel to the plane of the path of movement of said reflector and in a direction at right angles to the line of intersection of the planes of said reflecting surfaces, and at an angle to the direction of the movement of said reflector, the ratio of the linear speed of the film to that of the reflector being as the height of an individual exposure is to the hypothenuse of a right angled triangle, the long side of which is equal to the width of said exposure and the short side of which is equal to one-half the height of an individual exposure.

12. The method of recording and projecting by a continuously open lens system a film having a successive area of exposures arranged substantially contiguous on the film and with the long dimensions of each exposure at right angles to the length of the film, which consists in moving through the field of illumination of the lens system one reflecting surface of a double reflector having two coacting reflecting surfaces disposed at right angles to each other and maintained in a fixed relationship with respect to each other and making respectively angles of 45° with the principal axis of said lens system, and simultaneously continuously moving said film in a plane parallel to the path of the movement of said reflectors and in a direction at right angles to the intersection of the planes of said reflecting surfaces, the ratio of the linear speed of the film to that of the reflector being as the height of an individual exposure is to the hypothenuse of a right angled triangle the sides of which are respectively equal to the width and one-half the height of the spacing of adjacent exposures on the film, and the angle of the direction of the travel of the reflector with respect to that of the film being such that the speed of the component of the movement of the reflectors in the direction of the movement of the film is one-half of that of the film.

13. In an optical device, the combination with a continuously open fixed lens, of a reflector unit having two coacting reflecting surfaces stationary with respect to each other and making a fixed and unvarying angle with each other, means to move said unit to cause one of said reflecting surfaces to pass through the field of illumination of said lens in a straight path, said unit being so disposed with respect to said axis of said lens that the angle which the axis of the lens makes with said reflecting surface in said field is equal to the angle at which said axis is reflected from the other reflecting surface, and means to longitudinally move a film disposed in a plane normal to the reflected axis of said lens in a straight path, at a constant speed and at an angle to the direction of the travel of said unit to maintain a stationary relationship between said film and said reflected axis.

14. In an optical apparatus, the combination of a reflector unit having two reflecting surfaces disposed at a fixed and unchangeable angle with respect to each other, a continuously open fixed lens, means to move said unit to cause one of said reflecting surfaces to pass through the axis of said lens in a straight line, said reflecting surface being operative to reflect said axis to the other of said reflecting surfaces and said other reflecting surface to reflect said axis therefrom at the same angle with respect thereto that the axis makes with the first reflecting surface, a film lying in a plane normal to the plane of the reflected axis of said lens, means to move said film longitudinally continually with the central line of said film maintained in a plane which is normal to the line of the intersection of said reflecting surfaces and in which is the axis of the lens, the direction and speed of the travel of said reflector unit having a component of its motion in the plane of the film traveling across the film a distance equal to the width of the exposure while the film travels the height of an exposure and another component in the plane of the film which travels at one-half of the linear speed of the film in the direction of the travel of the film whereby the distance between the optical center of the lens and the film within the area of the field of illumination of the lens is maintained constant and the film is maintained stationary with respect to the reflected area of the lens.

15. In an optical apparatus, the combination with a continuously open fixed lens, of a reflector unit having two coacting reflecting surfaces stationary with respect to each other and making a fixed and unvarying angle with respect to each other, means to move said unit continuously to pass one of said reflecting surfaces in a straight line through the field of illumination of the lens, with said reflecting surface disposed at an angle to the principal axis of the lens to reflect said principal axis to the other reflecting surface, and said other reflecting surface reflecting said axis at an angle thereto equal to the angle of the incidence of said axis with said first reflector, a film disposed in a plane normal to the reflected axis of said lens, and means to move said film in said plane constantly with its central line in a plane in which lies the axis of said lens and the reflected axis of said lens, the width of said reflector unit being equal to the dimension of the exposure of the film which is transverse to the film and the speed and direction of travel of the reflector unit being operative to cause the reflection from the said other reflector to move in the direction of the travel of the film and at the same speed as that of the film.

16. In an optical apparatus, the combination of a continuously open fixed lens, a reflector unit having two coacting reflecting surfaces stationary with respect to each other and means to move said unit to cause one of said reflecting surfaces to pass through the field of illumination of said lens in a straight path, the direction and speed of said reflector having a component in the plane of the film which moves across the film a distance equal to the transverse dimensions of the exposure on the film in the same time that the film moves a distance equal to the dimension on the exposure of the film parallel to the length of the film and the space between adjacent exposures, and a component in the plane of the film longitudinally of the film that moves at one-half of the speed of the film and in the direction of the travel of the film.

17. In an optical apparatus, the combination of a continuously open fixed lens, a reflector unit having two coacting reflecting surfaces stationary with respect to each other and means to move said unit to cause one of said reflecting surfaces to pass through the field of illumination of said lens in a straight path, the direction and speed of said reflector having a component in the plane of the film which moves across the film a distance equal to the transverse dimension of the exposure on the film in the same time that the film moves a distance equal to the dimension on the exposure of the film parallel to the length of the film and the space between adjacent exposures, and a component in the plane of the film longitudinally of the film that moves at one-half of the speed of the film and in the direction of the travel of the film, the longitudinal median line of the film being in the plane in which are the axis of the lens and the reflected axis of the lens.

18. In an optical device, the combination of a continuously open fixed lens, a reflector unit having two coacting reflecting surfaces stationary with respect to each other and making a fixed and unvarying angle with respect to each other, and means to move said unit to cause one of said reflecting surfaces to pass in a straight line through the field of illumination of said lens, the plane of travel of said reflectors being normal to a plane bisecting the angle which the reflecting surfaces of the unit make with each other and in a direction in said plane which has two components in the plane of the film at right angles to each other, one of said components having a speed and direction at right angles to the direction of the movement of the film which bears the same relation to the speed of the film that the corresponding transverse dimension on the exposure bears to the other dimension of the exposure.

19. In an optical device, the combination of a continuously open fixed lens, a reflector unit having two coacting reflecting surfaces stationary with respect to each other and making a fixed and unvarying angle with respect to each other, and means to move said unit to cause one of said reflecting surfaces to pass in a straight line through the field of illumination of said lens, the plane of travel of said reflectors being normal to a plane bisecting the angle which the reflecting surfaces of the unit make with each other and in a direction in said plane which has two components in the plane of the film at right angles to each other, one of said components having a speed and direction at right angles to the direction of the movement of the film which bears the same relation to the speed of the film that the corresponding transverse dimension on the exposure bears to the other dimension of the exposure, the other component having a speed in the direction of the travel of the film of one-half of the speed of the film.

20. In an optical apparatus, the combination with a continuously open fixed lens, a reflector unit having two coacting reflecting surfaces stationary with respect to each other and making a fixed and unvarying angle with respect to each other, means to move said unit to cause one of said reflecting surfaces to pass through the field of illumination of said lens in a straight line, a film mounted to move in a plane normal to the axis of said lens as reflected from the other of said reflecting surfaces, the central line of said film being in the plane in which also lies the said axis of said lens and the reflected axis, the speed and direction of the travel of said reflector having a component in the plane of said film at right angles to the direction of the travel of the film and another component in the plane of the film parallel to the direction of movement of said film, said first component having a speed bearing the same ratio to the speed of the film that the transverse dimension of the exposure bears to the longitudinal dimension of the exposure on the film and the other said component in the plane of the film having a speed equal to one-half of the linear speed of the film.

21. In an optical apparatus, the combination with a continuously open fixed lens, a reflector unit having two coacting reflecting surfaces stationary with respect to each other and making a fixed and unvarying angle with respect to each other, means to move said unit to cause one of said reflecting surfaces to pass through the field of illumination of said lens in a straight line, a film mounted to move in a plane normal to the axis of said lens as reflected from the other of said reflecting surfaces and in a plane in which also lies the said axes of said lens, the speed and direction of the travel of said reflector having a component in the plane of said film at right angles to the direction of the travel of the film and another component in the plane of the film parallel to the direction of movement of said film, said first component having a speed bearing the same ratio to the speed of the film that the transverse dimension of the exposure bears to the longitudinal dimension of the exposure on the film and the other said component in the plane of the film having a speed equal to one-half of the linear speed of the film, and a plate adjacent said film and between said film and said unit and having a rhomboidal opening therethrough, the center line of which intersects the reflected axis of said lens, two parallel sides of said opening being parallel to the direction of the travel of the film, the distance between the two said sides of said opening being substantially equal to the transverse dimension of the exposure on said film and substantially equal to the width of a reflecting surface, the tangent of the acute angle of said opening being substantially the ratio of the dimension of a single exposure on said film measured longitudinally of the film to the dimension of said exposure measured transversely to said film.

22. In an optical apparatus, the combination with a continuously open fixed lens, a reflector unit having two coacting reflecting surfaces stationary with respect to each other and making a fixed and unvarying angle with respect to each other, means to move said unit to cause one of said reflecting surfaces to pass through the field of illumination of said lens in a straight line, a film mounted to move in a plane normal to the axis of said lens as reflected from the other of said reflecting surfaces and in a plane in which also lies the said axes of said lens, the speed and direction of the travel of said reflector having a component in the plane of said film at right angles to the direction of the travel of the film and another component in the plane of the film parallel to the direction of the movement of said film, said first component having a speed bearing the same ratio to the speed of the film that the transverse dimension of the exposure bears to the longitudinal dimension of the exposure on the film and the other said component in the plane of the film having a speed equal to one-half of the linear speed of the film, and a plate adjacent said film and between said film and said unit and having a rhomboidal opening therethrough, the center of which is in the reflected axis of said lens, two parallel sides of said opening being parallel to the direction of the travel of the film, the distance between the two said sides of said opening being substantially equal to the transverse dimension of the exposure on said film and substantially equal to the width of a reflecting surface, the tangent of the acute angle of said opening being substantially the ratio of the dimension of a single exposure on said film measured longitudinally of the film to the dimension of said exposure measured transversely to said film, the length of said sides of said opening parallel to the direction of the movement of said film being equal to the sum of the dimension of two adjacent exposures on the film measured longitudinally of the film.

23. In an optical apparatus, the combination with a continuously open fixed lens and a film, of a series of substantially contiguous reflecting units each having two coacting reflecting surfaces stationarily fixed at an angle of 90° with respect to each other and each in a plane respectively making an angle of 45° with the principal axis of the lens, means to continuously move one of the reflecting surfaces of each of said units consecutively through the field of illumination of said lens in a path at right angles to the principal axis of said lens, means to move a film over the second reflectors of said units in a plane parallel to the plane of the movement of said reflecting units and in a direction at right angles to the intersections of the planes of said reflecting surfaces, the relation of the linear speed of the reflector units to that of the film being that a reflector unit moves across the exposed portion of said film in the same time that the film travels substantially the height of an individual exposure, the angle of the direction of the travel of the reflector units with respect to the travel of the film being such that the film is stationary with respect to the principal axis of the lens as reflected from the second reflecting surfaces of said reflector units while the reflector units are passing through the field of illumination of said lens, a member having a series of substantially rectangular openings therethrough of substantially the same size and shape as an individual exposure on said film, and means to move said member in a path transverse to said film and in a plane adjacent and parallel to the sensitized surface of said film, and at a speed, the two components of which, namely, transverse to the film and in the direction of the travel of the film, are respectively as the width of an individual exposure is to the height of an individual exposure plus the space between two individual exposures.

24. In an optical apparatus, the combination with a continuously open fixed lens and a film, of a series of substantially contiguous reflecting units each having two coacting reflecting surfaces stationarily fixed at an angle of 90° with respect to each other and each in a plane respectively making an angle of 45° with the principal axis of the lens, means to continuously move one of the reflecting surfaces of each of said units consecutively through the field of illumination of said lens in a path at right angles to the principal axis of said lens, means to move a film over the second reflectors of said units in a plane parallel to the plane of the movement of said reflecting units and in a direction at right angles to the intersections of the planes of said reflecting surfaces, the relation of the linear speed of the reflector units to that of the film being that a reflector unit moves across the exposed portion of said film in the same time that the film travels substantially the height of an individual exposure, the angle of the direction of the travel of the reflector units with respect to the travel of the film being such that the film is stationary with respect to the principal axis of the lens as reflected from the second reflecting surfaces of said reflector units while the reflector units are passing through the field of illumination of said lens, a member having a series of openings therethrough, and means to move said member in a path transverse to said film and in a plane adjacent and parallel to the sensitized surface of said film, and at a speed, the two components of which, namely, transverse to the film and in the direction of the travel of the film, are respectively as the width of an individual exposure is to the height of an individual exposure plus the space between two individual exposures.

25. In an optical apparatus, the combination of a continuously open fixed lens, a series of reflector units each having two coacting reflecting surfaces stationary with respect to each other and means to move said series of units to cause one of the reflecting surfaces of each unit to pass successively through the field of illumination of said lens in a straight path, the direction and speed of said reflector having a component in the plane of the film which moves across the film a distance equal to the width of the exposure in the same time that the film moves longitudinally a distance equal to the height of the exposure plus the space between adjacent exposures and a component in the plane of the film which moves at one-half of the speed and in the direction of the travel of the film, a member having a series of apertures therethrough, and means to cause said member to travel in a direction having two components in the plane of the film, one transverse to the film and moving across the film while the film is moving a distance equal to the height of the exposure on the film and the other in the direction of the travel of the film at the same speed as that of the film.

26. In an optical apparatus, the combination of a continuously open fixed lens, a series of reflector units each having two coacting reflecting surfaces stationary with respect to each other and means to continually move said series of units to cause one of the reflecting surfaces of each unit to pass successively through the field of illumination of said lens in a straight path, the direction and speed of said reflectors having two components at right angles to each other and in the plane of the film, one of components which moves across the film a distance equal to the width of the exposure in the same time that the film moves longitudinally a distance equal to the height of the exposure plus the space between adjacent exposures, and the other of which moves at one-half of the linear speed of the speed of the film and in the direction of the travel of the film, a member having a series of apertures therethrough, and means to cause said member to travel in a direction and at a speed having two components at right angles to each other in the plane of the film, one of said components being transverse to the film and moving across the film while the film is moving a distance equal to the height of the exposure on the film plus the distance between adjacent exposures on the film, and the other component being in the direction of the travel of the film and moving at the same speed as that of the film.

27. In an optical apparatus, the combination of a continuously open fixed lens, a series of reflector units each having two coacting reflecting surfaces stationary with respect to each other and means to continously move said series of units to cause one of the reflecting surfaces of each unit to pass successively through the field of illumination of said lens in a straight path, the direction and speed of said reflectors having two components at right angles to each other and in the plane of the film, one of components which moves across the film a distance equal to the width of the exposure in the same time that the film moves longitudinally a distance equal to the height of the exposure plus the space between adjacent exposures, and the other of which moves at one-half of the linear speed of the speed of the film and in the direction of the travel of the film, a member having a series of apertures therethrough, and means to cause said member to travel in a direction and at a speed having two components at right angles to each other in the plane of the film, one of said components being transverse to the film and moving across the film while the film is moving a distance equal to the height of the exposure on the film plus the distance between adjacent exposures on the film, and the other component being in the direction of the travel of the film and moving at the same speed as that of the film, the apertures in said member being each provided with a color screen and the series of apertures in said member presenting like recurring sets of color screens throughout the length of said member, each set having the same order and sequence of colors.

In witness whereof, I have hereunto set my hand this first day of April, 1926.

EDMOND H. LYSLE.